(12) United States Patent
Yanai

(10) Patent No.: US 8,672,010 B2
(45) Date of Patent: Mar. 18, 2014

(54) TIRE FOR HEAVY LOAD

(75) Inventor: Kenjiro Yanai, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 272 days.

(21) Appl. No.: 12/936,797

(22) PCT Filed: Apr. 10, 2009

(86) PCT No.: PCT/JP2009/057367
§ 371 (c)(1),
(2), (4) Date: Oct. 7, 2010

(87) PCT Pub. No.: WO2009/125842
PCT Pub. Date: Oct. 15, 2009

(65) Prior Publication Data
US 2011/0030870 A1 Feb. 10, 2011

(30) Foreign Application Priority Data
Apr. 10, 2008 (JP) .................. 2008-102210

(51) Int. Cl.
*B60C 9/18* (2006.01)
(52) U.S. Cl.
USPC .......................... 152/527; 152/537
(58) Field of Classification Search
USPC ................................ 152/527, 537
See application file for complete search history.

(56) References Cited

U.S. PATENT DOCUMENTS

| | | | |
|---|---|---|---|
| 5,779,828 A | 7/1998 | Okamoto |
| 6,016,859 A | 1/2000 | Okamoto |
| 6,308,759 B1 | 10/2001 | Okamoto |
| 6,311,750 B1 | 11/2001 | Okamoto |
| 6,311,751 B1 | 11/2001 | Okamoto |
| 6,371,184 B1 | 4/2002 | Okamoto |
| 6,443,203 B1 | 9/2002 | Okamoto |

FOREIGN PATENT DOCUMENTS

| | | | | |
|---|---|---|---|---|
| EP | 0 785 095 A1 | 7/1997 | | |
| EP | 0900820 A1 | 3/1999 | | |
| JP | 58-112808 A | 7/1983 | | |
| JP | 05-008607 A | 1/1993 | | |
| JP | 06-127213 A | 5/1994 | | |
| JP | 07-032815 A | 2/1995 | | |
| JP | 11-321224 A | 11/1999 | | |
| JP | 2003-063205 | * 3/2003 | ............... B60C 1/00 |
| JP | 2003-063205 A | 3/2003 | | |
| JP | 2005-112176 A | 4/2005 | | |
| JP | 2005-290024 A | 10/2005 | | |
| JP | 2006-152117 | * 6/2006 | ............... B60C 1/00 |
| JP | 2006-152117 A | 6/2006 | | |
| JP | 2007-313944 A | 12/2007 | | |

OTHER PUBLICATIONS

Database WPI, Week 198911, Thomson Scientific, London, GB; AN 1989-082530; XP000002656972.
Database WPI, Week 200577, Thomson Scientific, London, GB; AN 2005-752908; XP000002656970.
Database WPI, Week 200615, Thomson Scientific, London, GB; AN 2006-141193; XP000002656971.

* cited by examiner

Primary Examiner — Robert D. Harlan
(74) Attorney, Agent, or Firm — Sughrue Mion, PLLC

(57) ABSTRACT

In a tire for a heavy load in which a belt is formed by laminating rubber-coated cord layers prepared by embedding steel cords in a coating rubber, an end part of at least one rubber-coated cord layer or an end part of the belt is coated with a rubber composition containing trans-polybutadiene (TRBR) and bismaleimide (BMI) in the following compounding amounts based on 100 parts by mass of a rubber component containing natural rubber and isoprene rubber:

0.1 part by mass≤$TRBR+BMI$≤10.0 parts by mass $TRBR/(TRBR+BMI)$≥25% whereby cracks originating from separation between the steel cords at an end part of the belt and the coating rubber are prevented from being generated.

9 Claims, No Drawings

TIRE FOR HEAVY LOAD

CROSS REFERENCE TO RELATED APPLICATIONS

This application is a National Stage of International Application No. PCT/JP2009/057367, filed on Apr. 10, 2009, which claims priority from Japanese Patent Application No. 2008-102210, filed on Apr. 10, 2008, the contents of all of which are incorporated herein by reference in their entirety.

TECHNICAL FIELD

The present invention relates to a tire for heavy vehicles, specifically to a tire for heavy load vehicles provided with a belt layer in which steel cords are embedded in coating rubber at the outside in a radial direction of a crown part of a carcass ply comprising a radial cord layer.

BACKGROUND ART

In recent years, as vehicles are increased in a size, tires which can endure a heavy load are required. Usually, tires are equipped with a belt layer formed by laminating plural layers comprising steel cords and coating rubber for coating the steel cords to provide the tires with load resistance, traction resistance and the like. In heavy load vehicles, however, separation at a belt end is liable to be brought about in tires provided with the above belt layer. The separation at a belt end is brought about by fatigue of the rubber at a belt end which is caused by dynamic interlayer shearing strain brought about by a load, driving force, braking force and lateral force each applied on the tire in addition to interlayer shearing strain exerted by air pressure of the tire.

In order to prevent the separation at a belt end, it is devised to change various mechanical structures of the belt layer and a rubber component formulation thereof, and it is proposed to enhance heat separation resistance and cut separation resistance of the tire while maintaining load resistance, traction resistance and cracking resistance thereof.

Proposed is, for example, a radial tire in which 5 or more belt layers are employed and in which a specific coating rubber is used for a master layer and a protective layer to thereby improve heat separation resistance and cut separation resistance of the whole part of the tire (patent document 1). Further, proposed is a radial tire for a heavy load which is improved in separation resistance while maintaining abrasion resistance, traction resistance and cutting resistance by constituting a belt layer from four layers having different widths, inclining steel cords of the constituted layers toward an equatorial plane of the tire, setting an inclining direction of steel cords of an adjacent layer to an equivalent direction or an inverse direction and constituting the belt layers in which the respective layers have suitably different lengths in a tire width direction (patent document 2 and patent document 3). Further, proposed is a pneumatic radial tire for a heavy load in which a right and left one pair of belt end cushion rubbers are arranged at both end parts between at least two layers among rubber-coated cord layers forming a principal cross belt, in which at least two cushion rubbers among the cushion rubbers positioned at the same end part side are arranged overlapping partially on each other in a tire width direction and in which a deviation width of the overlapped cushion rubbers in a tire width direction falls in a specific range (patent document 4).

Also, proposed as well are a rubber composition which maintains high elasticity even in vulcanization of a large-sized tire for a long time and which has durability and a radial tire for heavy vehicles which is provided with a belt layer comprising the rubber composition and which has heat build-up resistance, durability and cracking resistance. That is, it is a radial tire provided with a belt layer in which a rubber composition compounded with trans-polybutadiene and N,N'-diphenylmethanebismaleimide as a heat resistant cross-linking agent in a specific proportion in combination is used for a coating rubber of steel cords (patent document 5).

Patent document 1: Japanese Patent Application Laid-Open Hei 7 No. 32815
Patent document 2: Japanese Patent Application Laid-Open Hei 5 No. 8607
Patent document 3: Japanese Patent Application Laid-Open Hei 6 No. 127213
Patent document 4: Japanese Patent Application Laid-Open Hei 11 No. 321224
Patent document 5: Japanese Patent Application Laid-Open No. 2003-63205

DISCLOSURE OF THE INVENTION

In a tire for heavy load vehicles, cracking generated from a belt end part due to a heavy load brings about a large obstruction for securing the form of the tire. Cracking at the belt end part is generated in a case in which separation is brought about between rubber and rubber in a coating rubber of plural belt layers and a case in which separation between the coating rubber and steel cords in one layer is brought about.

In a steel cord coating rubber, an adhesive property of the steel cord with the rubber is important, and an adhesion promoter for adhesion is added to a rubber composition used for the coating rubber, or a relatively large amount of sulfur is compounded with a rubber composition used for the coating rubber. However, not only an adhesive property but also properties such as high hardness, low heat build-up, a high breaking property, a good aging property, a low bend cracking property are required for prevention of separation, and among the above properties, it is more effective to enhance the hardness. Means such as increasing a compounding amount of a filler such as carbon black, adding a resin and the like, increasing a compounding amount of a cross-linking agent such as sulfur and increasing a compounding amount of a vulcanization-accelerator have so far been employed in order to increase the hardness. The hardness is increased by the above methods, but the problem that the low heat build-up, the durability, the workability and the adhesive property are reduced is involved therein.

An object of the present invention is to provide a tire for a heavy load in which cracks originating from separation between steel cords and coating rubber at a belt end part can be prevented from being brought about and progressing without almost changing a conventional belt structure of the tire for a heavy load while controlling an increase in a weight of rubber to the lowest level.

The present invention relates to a tire for a heavy load provided with bead cores disposed at a right and left one pair of bead parts, a carcass ply comprising a radial cord layer which is extended from a crown part to both bead parts via both side wall parts and which is wound around the above bead core to be tied to the bead part, a belt arranged at the outside of the carcass ply in a radial direction of the crown part and a tread, wherein the belt is formed by laminating rubber-coated cord layers prepared by embedding steel cords in a coating rubber, and separation of the steel cords at an end part of the rubber-coated cord layer and an end part of the belt from the coating rubber is aimed to be prevented from being brought about. In belt end separation, the steel cord moves in the inside of the belt due to dynamic interlayer shearing strain exerted by a load, driving force, braking force and lateral force which are applied on the tire in addition to interlayer shearing strain exerted by air pressure of the tire, whereby separation is generated from the rubber at an end of the belt and developed into the inside.

In the present invention, in order to prevent separation of a belt end, an end part of a rubber-coated cord layer is coated with a rubber composition which contains a specific proportion of trans-polybutadiene and bismaleimide as a heat resistant cross-linking agent and which is different from the coating rubber for embedding steel cords. Either the end part of one rubber-coated cord layer or the end parts of all plural layers may be coated with the rubber composition. In a coating manner thereof, the steel cords may be coated with a conventional coating rubber leaving the end part uncoated, and only the end part of the steel cords may be coated with the rubber composition described above so that it is wrapped directly therein, or the whole part of the steel cord may be coated with a conventional coating rubber and may be further coated thereon with the above rubber composition. This makes it possible to effectively inhibit separation between the rubber-coated cord layer and the belt end part.

Effects of the Invention

According to the present invention, provided is the excellent effect that cracks originating from separation between the steel cord and coating rubber can be inhibited from being brought about and progressing by coating an end part of rubber-coated steel cords in a tire belt with rubber having high hardness.

Mode for Carrying Out the Invention

A coating rubber composition for coating steel cords of a tire belt used in the present invention comprises, for example, at least one of natural rubber and diene base synthetic rubbers such as polybutadiene and polyisoprene, and 5.0 phr of sulfur and 55.0 phr of carbon black of N330 as carbon black are added thereto. In addition thereto, various compounding ingredients for rubber such as an adhesive auxiliary agent, a vulcanization accelerator and an antioxidant are used.

In the present invention, a belt is formed by coating steel cords with the coating rubber composition described above, and it is characterized in that an end part thereof is further coated on the coating thereof with a rubber composition for coating an end part having high hardness so that it is wrapped therein, or only an end part of the steel cords is not coated with the coating rubber composition described above, and an end part of a rubber-coated cord layer is coated with the rubber composition for coating the end part so that it is wrapped therein.

The rubber composition for coating an end part used in the present invention with which an end part of the steel cords is coated contains natural rubber and polyisoprene, and 50% by mass or more of the natural rubber is preferably contained. If it is less than 50% by mass, reduction in the adhesive property and the rubber fracture property is brought about in a certain case. Styrene•butadiene rubber (SBR), polybutadiene (BR), butyl rubber (IIR), halogenated butyl rubber (X-IIR), ethylene•propylene•diene rubber (EPDM) and the like can be used as the balance of the rubber component.

In a case of SBR, it is preferably solution polymerization SBR in which a content of a vinyl bond in a butadiene part is 35 to 85% by mass and in which an amount of bonded styrene is 30% by mass or less, and this is because of the reasons that a heat resistant aging property of the rubber can be improved by controlling the content of a vinyl bond to 35% by mass or more and that a fracture property of the rubber can be maintained by controlling it to 85% by mass or less. Reduction in the adhesive property can be inhibited by controlling the content of an amount of bonded styrene to 30% by mass or less.

The rubber composition for coating an end part in the present invention is compounded with trans-polybutadiene (TRBR) and bismaleimide (BMI) in addition to the rubber components described above.

Because of the reasons that bismaleimides themselves are polymerized and that they cross-link directly diene base polymers such as natural rubber without the presence of sulfur, bismaleimide can increase hardness of the rubber without damaging low heat build-up and deterioration resistance of the rubber. Strain exerted on a belt end is reduced by hardening the rubber, and separation between the rubber and the steel cords is prevented by transferring the strain from rubber-steel cords to rubber-rubber. Further, hardness of the end part is enhanced without enhancing hardness of the coating rubber by coating the rubber-coated cord layer and the belt end part with a rubber composition different from the coating rubber, and separation of the end part can effectively be inhibited. When trans-polybutadiene (TRBR) and bismaleimide (BMI) are added to the coating rubber, separation between the rubber and the steel cords can be prevented as well, and separation of the end part can be prevented by coating the rubber-coated cord layer and the belt end part with the above rubber composition.

Bismaleimide which can be used in the present invention shall not specifically be restricted, and bismaleimide represented by the following formula can be used:

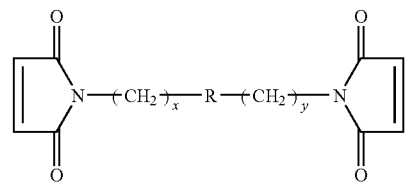

(wherein R represents an aromatic group having 6 to 18 carbon atoms or an alkyl aromatic group having 7 to 24 carbon atoms, and x and y each represent independently an integer of 0 to 3).

Capable of being exemplified as suitable bismaleimide are N,N'-1,2-phenylenebismaleimide, N,N'-1,3-phenylenebismaleimide, N,N'-1,4-phenylenebismaleimide, N,N'-1,4-xylilenebismaleimide, N,N'-(4,4'-diphenylmethane)bismaleimide, 2,2-bis[4-(4-maleimidephenoxy)phenyl]propane, bis(3-ethyl-5-methyl-4-maleimidephenyl)methane and the like, and N,N'-(4,4'-diphenylmethane)bismaleimide is particularly preferred. At least one of them can be contained in the rubber composition.

Either commercial products or products obtained by synthesis may be used as trans-polybutadiene used for the rubber composition for coating an end part in the present invention. An example of a production process for the same includes a process in which butadiene monomers are brought into contact with a four component catalyst of nickel boroacylate, tributylaluminum, triphenyl phosphite and trifluoroacetic acid in a solvent and polymerized.

Trans-polybutadiene has preferably a trans-bond content of 82 to 98% by mass, and it is more preferably 86 to 98% by mass in terms of effects. Further, when a mass average molecular weight thereof is 30,000 to 200,000, the processability in non-vulcanization can be improved, and a fracture resistance of the vulcanized rubber can be maintained.

A compounding amount of bismaleimide (BMI) and trans-polybutadiene (TRBR) is 0.1 to 10.0 parts by mass in combination of BMI and TRBR per 100 parts by mass of the rubber component from the viewpoints of compatibility with the rubber component and fracture resistance and heat build-up of the vulcanized rubber, and a proportion of TRBR is 25% or more based on the total of BMI and TRBR, that is, 0.1 part by mass≤$TRBR+BMI$≤10.0 parts by mass $TRBR/(TRBR+BMI) \geq 25\%$ This includes a case in which BMI is not contained and in which TRBR accounts for 100%.

The compounding amount is preferably 0.1 to 7.0 parts by mass, more preferably 1.0 to 7.0 parts by mass in combination of BMI and TRBR per 100 parts by mass of the rubber component.

Further, a proportion of TRBR is preferably 50% or more based on the total of BMI and TRBR.

If the total amount of the compounding amounts of BMI and TRBR which are contained in the rubber component exceeds 10 parts by mass, the cracking resistance tends to be reduced. Further, an amount of BMI is 0 to 6.0 parts by mass, preferably 0.1 to 4.0 parts by mass per 100 parts by mass of the rubber component. If the amount of BMI exceeds 6.0 parts by mass, the cracking resistance tends to be reduced, and BMI tends to remain unreacted in the rubber composition after vulcanized. As a result, the effect that a stable cross-linking pattern which is a characteristic of BMI is formed to enhance the heat resistant aging property is damaged in a certain case.

Further, a compounding amount of TRBR contained in the rubber component is 25% or more based on the total amount of BMI and TRBR. If it is less than 25%, tan δ of the tire grows large, and the hysteresis loss is increased. Accordingly, the cracking resistance is not sufficiently enhanced in proportion to the high tensile stress in 100% elongation of the rubber.

The rubber composition for coating an end part used in the present invention can contain, in addition to the rubber components, BMI and TRBR each described above, various components usually used in the rubber industry. Capable of being listed as various components are, for example, fillers including reinforcing fillers such as carbon black, silica and inorganic fillers such as calcium carbonate and additives including vulcanization accelerators, antioxidants, zinc oxide, stearic acid, softening agents, ozone degradation inhibitors and the like. Capable of being listed as the vulcanization accelerator are thiazole base vulcanization accelerators such as M (2-mercaptobenzothiazole), DM (dibenzothiazyl sulfide), CZ (N-cyclohexyl-2-benzothiazylsulfeneamide), thiuram base vulcanization accelerators such as TT (tetramethylthiuram sulfide) and guanidine base vulcanization accelerators such as DPG (diphenylguanidine).

The rubber composition for coating an end part in the present invention has preferably the following characteristic. That is, the tensile stress in 100% elongation after vulcanization is 2.5 MPa (megapascal) or more, preferably 3.5 MPa or more. The tensile stress can be measured according to JIS K6301-1995. If the tensile stress is too small, the belt layer in a constant stress which is an input into a belt rubber of the tire is increased in strain and the like when used as a rubber for coating, and the cracking resistance tends to be reduced.

Also, the rubber composition for coating an end part in the present invention has preferably tan δ of 0.300 or less, preferably 0.250 or less when measured under the conditions of a temperature of 25° C. and a distortion of 2%. The term tan δ is an index of a hysteresis loss, and the larger the tan δ is, the higher the hysteresis loss is, and the more the heat build-up is. That is, when tan δ grows larger, the rubber composition tends to be reduced in heat build-up resistance. The value of tan δ can be measured under the condition of a frequency of 52 Hz by means of, for example, a viscoelasticity tester (spectrometer, manufactured by Toyo Seiki Seisakusho, Ltd.).

The tire for a heavy load according to the present invention is provided with a belt in which the rubber composition for coating an end part described above is used for coating an end part of the belt layer. The belt comprises a rubber-coated layer in which an end part of steel cords coated with a steel cord coating rubber may further be coated on a coating thereof with the rubber composition for coating an end part so that it is wrapped therein, or in which an end of steel cords is coated with the rubber composition for coating an end part so that it is wrapped therein without coating only an end part of the steel cords with the coating rubber composition. Any ones may be used for the steel cord as long as they are steel cords which have so far been used in the tire industry. The belt of the present invention may have other layers in addition to the steel cord and the coating rubber each described above. The tire for a heavy load having the belt of the present invention is a tire used for heavy vehicles, particularly heavy construction vehicles, and it can be used as well for other heavy load vehicles.

EXAMPLES

Next, the present invention shall be explained in detail with reference to examples and comparative examples, but the present invention shall by no means be restricted to the following examples.

Examples 1 to 8 and Comparative Examples 1 to 5

Steel cords were embedded into a coating rubber composition having a recipe shown in Table 1 to prepare a rubber-coated cord layer, and an end part thereof was coated in 20 mm or more with the respective rubber compositions for coating an end part shown in Table 2 so that the end part was wrapped therein. A tire having a belt obtained by laminating four layers of the above layer was prepared.

The respective rubber compositions for coating an end part were kneaded and vulcanized at 145° C. for 60 minutes, and the physical properties of the resulting vulcanized rubbers were measured by the following methods. Further, fatigue fracture resistance of the tire was evaluated by the following method. The evaluation results thereof are shown in Table 2.

Trans-polybutadiene used for the rubber compositions shown in Table 2 was prepared in the following process.

<Preparation of Trans-Polybutadiene>

A stainless-made reaction vessel equipped with a thermometer, a stirrer, a pressure device and an inlet and outlet port was arranged, and the inside of this vessel was substituted with nitrogen gas. The above vessel was charged with 4086 g of a butadiene/hexane solution (butadiene: 23.7% by mass), 12.0 ml of a hexane solution of 0.84 mol/L nickel boroacylate (hereinafter referred to as NiOB), 49 ml of a hexane solution of 0.62 mol/L tributylaluminum (hereinafter referred to as TIBAL), about 27 ml of a hexane solution of triphenyl phosphite (hereinafter referred to as TPP) (a solution prepared by dissolving 2.64 ml of a concentrate solution of TPP in 25 ml of hexane) and about 40 ml of a hexane solution of trifluoroacetic acid (hereinafter referred to as TFA) (a solution prepared by dissolving 15.6 ml of TFA in 25 ml of hexane), and the mixture was homogeneously mixed to carry out polymerization reaction at 80° C. for 6 hours. A mole ratio of the catalyst was NiOB/TIBAL/TPP/TFA=1/3/1/20.

Then, the above solution was poured into a vessel charged with excess isopropanol and an antioxidant to terminate the polymerization and precipitate solids. Further, this was filtrated and dried at 50° C. under vacuum to obtain crystalline trans-polybutadiene (hereinafter abbreviated as TR-BR). TR-BR thus obtained had a trans-bond content of 92% and a mass average molecular weight of $3.2 \times 10^4$.

1) Tensile Stress in 100% Elongation (100% MOD):

The vulcanized product obtained as a sample was measured according to JIS K6301-1995.

2) Loss Factor (tan δ):

A test piece of the vulcanized product obtained was measured under the conditions of a temperature of 25° C., a distortion of 2% and a frequency of 52 Hz by means of a viscoelasticity tester (spectrometer, manufactured by Toyo Seiki Seisakusho, Ltd.).

3) Fatigue Fracture Resistance:

The sample tire was subjected to a drum test under the conditions of a constant speed and step load, and a length of cracking from an end of the belt after finishing the drum test was measured to turn an inverse number of the measured value into an index, wherein a length of cracking in Comparative Example 1 was set to 100. It is shown that the larger the index value is, the shorter the length of cracking is and that the better the fatigue fracture resistance is.

TABLE 1

| Recipe | Parts by mass |
|---|---|
| Natural rubber | 100.0 |
| Carbon black*1 | 55.0 |
| Antioxidant*2 | 0.5 |
| Adhesion promoter*3 | 0.5 |
| Zinc oxide | 8.0 |
| Vulcanization accelerator*4 | 0.5 |
| Sulfur | 5.0 |

TABLE 2

| | Comparative Example | | | | | Example | | | | | | | | Part by mass |
|---|---|---|---|---|---|---|---|---|---|---|---|---|---|---|
| | 1 | 2 | 3 | 4 | 5 | 1 | 2 | 3 | 4 | 5 | 6 | 7 | 8 | |
| Natural rubber | 100 | 100 | 100 | 98.4 | 94.0 | 96.0 | 95.0 | 98.0 | 98.0 | 94.0 | 97.0 | 99.4 | 95.0 | |
| TRBR | 0.0 | 0.0 | 0.0 | 1.6 | 6.0 | 4.0 | 5.0 | 2.0 | 2.0 | 6.0 | 3.0 | 0.6 | 5.0 | |
| Carbon black*1 | 55.0 | 50.0 | 50.0 | 50.0 | 50.0 | 50.0 | 50.0 | 50.0 | 50.0 | 55.0 | 55.0 | 55.0 | 55.0 | |
| Antioxidant*2 | 0.5 | 0.5 | 0.5 | 0.5 | 0.5 | 0.5 | 0.5 | 0.5 | 0.5 | 0.5 | 0.5 | 0.5 | 0.5 | |
| Adhesion promoter*3 | 0.5 | 0.5 | 0.5 | 0.5 | 0.5 | 0.5 | 0.5 | 0.5 | 0.5 | 0.5 | 0.5 | 0.5 | 0.5 | |
| Zinc oxide | 8.0 | 8.0 | 8.0 | 8.0 | 8.0 | 8.0 | 8.0 | 8.0 | 8.0 | 8.0 | 8.0 | 8.0 | 8.0 | |
| Vulcanization accelerator*4 | 0.5 | 0.5 | 1.0 | 0.5 | 0.5 | 0.5 | 0.5 | 0.5 | 0.5 | 0.5 | 0.5 | 0.5 | 0.5 | |
| Sulfur | 5.0 | 7.0 | 5.0 | 5.0 | 5.0 | 5.0 | 5.0 | 5.0 | 5.0 | 5.0 | 5.0 | 5.0 | 5.0 | |
| BMI*5 | 0.0 | 0.0 | 0.0 | 6.4 | 6.0 | 4.0 | 2.0 | 5.0 | 2.0 | 1.5 | 0.8 | 0.4 | 0.5 | |
| TRBR + BMI | | | | 8.0 | 12.0 | 8.0 | 7.0 | 7.0 | 4.0 | 7.5 | 3.8 | 1.0 | 5.5 | |
| TRBR/(TRBR + BMI) (%) | | | | 20 | 50 | 50 | 71 | 29 | 50 | 80 | 79 | 60 | 91 | |
| 100% MOD (MPa) | 3.7 | 3.3 | 3.7 | 4.2 | 4.5 | 4.2 | 3.8 | 4.1 | 3.7 | 4.1 | 4.0 | 3.8 | 3.7 | |
| tan δ | 0.205 | 0.186 | 0.198 | 0.212 | 0.220 | 0.199 | 0.193 | 0.198 | 0.193 | 0.202 | 0.198 | 0.200 | 0.191 | |
| Cracking resistance | 100 | 86 | 77 | 98 | 88 | 107 | 111 | 110 | 112 | 108 | 135 | 120 | 115 | |

Remarks (Tables 1 and 2)

*1: Carbon Black N330

*2: Nocrac 6C (manufactured by Ouchi Shinko Chemical Industrial Co., Ltd.)

*3: Cobalt naphthenate

*4: Nocceler DZ (manufactured by Ouchi Shinko Chemical Industrial Co., Ltd.)

*5: N,N'-(4,4'-diphenylmethane)bismaleimide

It can be found from the results shown in Table 2 that the tires prepared in Examples 1 to 8 in which an end of the belt is coated with the rubber composition falling in the scope of the present invention are excellent in cracking resistance

The invention claimed is:

1. A tire for a heavy load which is provided with bead cores, a carcass ply, a belt arranged at the outside of the carcass ply in a radial direction and a tread, and in which the belt is formed by laminating rubber-coated cord layers prepared by embedding steel cords in a coating rubber, wherein the coating rubber has a composition that comprises at least one of a natural rubber and a diene-based synthetic rubber, and wherein an end part of at least one rubber-coated cord layer or an end part of the belt is further coated with an end-part rubber composition containing trans-polybutadiene (TRBR) and bismaleimide (BMI) in the following compounding amounts based on 100 parts by mass of a rubber component containing natural rubber and isoprene rubber:

$0.1$ part by mass $\leq TRBR+BMI \leq 10.0$ parts by mass; and $TRBR/(TRBR+BMI) \geq 25\%$; and wherein the coating rubber composition is different from the end-part rubber composition.

2. The tire for a heavy load as described in claim 1, wherein the compounding amounts of trans-polybutadiene (TRBR) and bismaleimide (BMI) are:

$0.1$ part by mass $\leq TRBR+BMI \leq 7.0$ parts by mass.

3. The tire for a heavy load as described in claim 2, wherein the compounding amounts of trans-polybutadiene (TRBR) and bismaleimide (BMI) are:

$1.0$ part by mass $\leq TRBR+BMI \leq 7.0$ parts by mass.

4. The tire for a heavy load as described in claim 1, wherein a compounding amount of bismaleimide (BMI) is:

$0.1$ part by mass $\leq BMI \leq 4.0$ parts by mass.

5. The tire for a heavy load as described in claim 1, wherein a proportion of trans-polybutadiene (TRBR) based on a total amount of trans-polybutadiene (TRBR) and bismaleimide (BMI) is:

$TRBR/(RBR+BMI) \geq 50\%$.

6. The tire for a heavy load as described in claim 1, wherein bismaleimide is represented by the following formula:

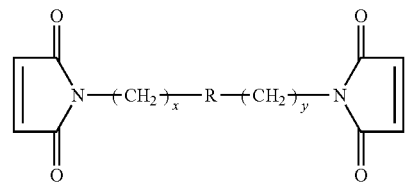

(wherein R represents an aromatic group having 6 to 18 carbon atoms or an alkyl aromatic group having 7 to 24 carbon atoms, and x and y each represent independently an integer of 0 to 3).

7. The tire for a heavy load as described in claim 1, wherein trans-polybutadiene has a trans-bond content of 82 to 98% by mass and a mass average molecular weight of 30,000 to 200,000.

8. The tire for a heavy load as described in claim 1, wherein the end-part rubber composition has a tensile stress of 2.5 MPa or more measured in 100% elongation after vulcanization according to JIS K6301-1995 and tan δ of 0.30 or less when measured under the conditions of a temperature of 25° C., a distortion of 2% and a frequency of 52 Hz.

9. The tire for a heavy load as described in claim 1, wherein the end parts of two or more rubber-coated cord layers are coated.

* * * * *